US012041896B2

(12) United States Patent
Baars et al.

(10) Patent No.: US 12,041,896 B2
(45) Date of Patent: Jul. 23, 2024

(54) METHOD OF PLANTING A TREE IN A CONTAINER, AND AN APPARATUS FOR POTTING A TREE

(71) Applicants: Hendrik Baars, IJzendoorn (NL); Gerrit Baars, Kesteren (NL)

(72) Inventors: Hendrik Baars, IJzendoorn (NL); Gerrit Baars, Kesteren (NL)

(*) Notice: Subject to any disclaimer, the term of this patent is extended or adjusted under 35 U.S.C. 154(b) by 170 days.

(21) Appl. No.: 17/736,573

(22) Filed: May 4, 2022

(65) Prior Publication Data

US 2022/0354066 A1 Nov. 10, 2022

(30) Foreign Application Priority Data

May 5, 2021 (NL) .................................. 2028145

(51) Int. Cl.
 *A01G 9/08* (2006.01)
 *A01G 9/02* (2018.01)
(52) U.S. Cl.
 CPC ............... *A01G 9/081* (2013.01); *A01G 9/02* (2013.01)
(58) Field of Classification Search
 CPC ........ A01G 9/081; A01G 9/083; A01G 9/085; A01G 9/086; A01G 9/08; A01G 9/088
 See application file for complete search history.

(56) References Cited

U.S. PATENT DOCUMENTS

| 2,826,003 A | * | 3/1958 | Oki ........................ | A01G 9/081 47/1.01 R |
| 2,869,283 A | * | 1/1959 | Krause .................... | A01G 9/083 47/1.01 R |
| 3,012,370 A | * | 12/1961 | Lortz ..................... | A01G 9/081 47/1.01 R |
| 3,337,986 A | * | 8/1967 | Boucher ................. | A01G 9/088 47/1.01 R |

FOREIGN PATENT DOCUMENTS

| CN | 106508477 B | | 11/2019 |
| DE | 9217013 U1 | * | 3/1993 |
| FR | 1570645 A | * | 6/1969 |
| FR | 2488100 A1 | * | 2/1982 |

* cited by examiner

*Primary Examiner* — Kristen C Hayes
(74) *Attorney, Agent, or Firm* — The Webb Law Firm

(57) ABSTRACT

A method of potting a tree, wherein the method includes the steps of inserting the root system of the tree into the lumen of the pot, and supplying a particulate substrate to the pot to cover the root system using an apparatus including a supply system. To pot trees quicker, the supply system includes i) a buffer, and ii) at least one chute, wherein the method includes providing the buffer with a predetermined amount of particulate substrate, and batch-wise release of the particulate material in the buffer to provide the pot with the particulate material from the buffer via the at least one chute by gravity.

11 Claims, 15 Drawing Sheets

METHOD OF PLANTING A TREE IN A CONTAINER, AND AN APPARATUS FOR POTTING A TREE

CROSS-REFERENCE TO RELATED APPLICATION

This application claims priority to Netherlands Patent Application No. 2028145 filed May 5, 2021, the disclosure of which is hereby incorporated by reference in its entirety.

TECHNICAL FIELD

The present disclosure relates to a method of planting a tree in a container, wherein:
  said tree comprising a root system and a stem, and
  a container for potting the plant is used, said container comprising a bottom wall, a sidewall extending from the bottom wall and an opening defined by the distal end of the sidewall, wherein the bottom wall and the sidewall define a lumen;
wherein the method comprises the steps of:
  inserting the root system of the tree into the lumen of the container, and
  supplying a particulate substrate to the container via the opening to cover the root system, the particulate substrate being supplied using an apparatus comprising a supply system.

BACKGROUND ART

Potting trees is widely known. It may be done manually. However, to save labour and/or reduce the time necessary to pot the tree, it is known to supply the particulate material using an apparatus comprising a screw conveyor. This screw conveyor may rotate for a predetermined number of turns to supply a set amount of particulate material into the pot.

The particulate material is typically potting soil.

SUMMARY OF INVENTION

The object of the present invention is to allow the above method to be performed quicker.

To this end, a method according to the preamble is characterized in that the supply system comprises i) a buffer, and ii) at least one chute, wherein the method comprises
  providing the buffer with a predetermined amount of particulate substrate,
  batch-wise release of the particulate material in the buffer to provide the container with the particulate material from the buffer via the at least one chute by gravity, the at least one chute having a distal end section comprising a distal chute opening and a lower edge, said lower edge being provided above the bottom of the container.

This allows the method to be performed faster as the step of providing the buffer with particulate material and the step of inserting the root system into the container may overlap. The method may also be performed quicker as it is easier to provide the correct amount of particulate material. The inhomogeneous nature of the particulate material affects the capability of a screw conveyor to provide the correct volume. As a result, in practice an operator is used who uses a pedal to start the supply of the particulate material and stop the conveyor when the desired volume is provided. This is a relatively slow process.

The container may be a sack or a tray, but it is typically a pot, which is the term that will be used onward.

The supply system preferably comprises more than one chute distributed along the circumference of the pot, preferably at most three and more preferably two. By having more than one chute, particulate substrate may be provided more evenly in the pot.

The present method may be automated to a large degree and may even be fully automated, as a robot may be used to hold the tree by its stem and insert the root system into the pot.

Batch-wise release of the particulate material may be achieved by rotating the buffer about an axis transverse to the vertical.

Typically, the particulate material is provided in two batches, first for covering the bottom of the pot before the root system is inserted in the pot and second to cover the root system after inserting the root system in the pot.

The particulate material may be potting soil, bark, peat, etc.

According to one embodiment, the apparatus comprises a valve between the buffer and the at least one chute, and the method comprises
  in a state where the valve is closed, providing the buffer with a predetermined amount of particulate substrate, and
  for the step of batch-wise release of the particular material opening the valve.

This is a simple manner to provide the particulate material to the pot, and it also allows a gradual release by opening the valve gradually.

It is possible that the apparatus comprises more than one valve, such as one valve per chute.

According to one embodiment, at least the distal end section of the chute is inclined with respect to the bottom of the container.

This leaves more space for the tree, which facilitates insertion of the root system into the pot, as the stem and, in particular, the top of the tree (which may be rather voluminous due to branches) are not likely to be hindered by the supply system. More specifically, in projection the buffer will not be above the bottom of the pot. Typically, the centerline through the opening of the distal end section will be at an angle between 20° and 65° with respect to the bottom, preferably between 30° and 55°.

According to one embodiment, the ratio of i) the smallest cross-sectional area of the buffer transverse to the centerline of the buffer, and ii) the sum of the smallest cross-sectional areas transverse to the centerline of the chutes is at most 2, preferably less than 1.4, and most preferably 1 or less.

This reduces the risk of clogging.

It is highly preferred that the buffer and/or the at least one chute do not taper inwardly towards a downstream flow path. A constant cross-sectional area allows for easy manufacturing of the supply system and, thus, reduced cost of performing the method.

According to one embodiment, the at least one chute is rotatably mounted with a proximal end section of the at least one chute being closer to the axis of rotation than the distal end section thereof.

This allows the distal end section to be moved above the opening of the pot and aside from the pot.

It may also allow the pot to be moved on a conveyor to the supply system without the arm to be in the way. In this position, it is not necessary for the inlet opening of a chute to be below the buffer, but typically it will still be.

According to one embodiment, the distal end section of the chute is provided with a stop for the container, and the container is moved to towards the stop and stopped by the stop.

Thus, the pot will be properly located below the chute opening.

The stop is preferably designed to center the pot. To that end, it will preferably have a concave side facing the pot in an upstream direction.

Typically the pot is placed onto a conveyor which will move the pot to the stop.

Typically the chute and thus the stop will move out of the way once the tree has been potted, and the potted tree is moved further.

According to one embodiment, the distal end section of the chute comprises a shell half comprising a concave side designed to center the container between distal openings of chutes.

The shell halves surrounding the pot prevent it from falling over.

According to one embodiment, the distal end section of a chute of the at least one chute comprises a press plate and the particulate substrate is compressed by relatively moving the bottom of the container and the distal end section closer to each other.

The press plate preferably has an arcuate form and is used with the stem facing the concave side of the press plate. This allows for better compression of the particulate material.

Compression of the particulate material causes voids to be reduced in size, in particular those between roots of the root system, as a result of which the tree is more likely to retain its orientation with respect to the pot.

Advantageously, the distal end section, and typically the chute, is moved downward to compress the particulate substrate that has been supplied to the pot.

According to one embodiment, the buffer is a slanted buffer, with in projection a top section of the buffer being relatively far from the bottom of the container and a bottom section of the buffer being relatively close to the bottom of the container.

This allows for more gradual acceleration by gravity of the particulate substrate in the buffer, reducing the risk of clogging of the chute by bridge formation.

According to one embodiment, while the buffer is provided with the particulate substrate, the height of the particulate substrate is monitored and the supply is stopped when a predetermined height is achieved.

Thus the predetermined amount of particulate material is established. It has been found that measuring the volume of the particulate material results in improved consistent potting of the tree compared to measuring the weight of the particulate substrate. The height (or level) may be measured using a distance sensor, such as a laser distance sensor.

Finally, the present disclosure relates to an apparatus for potting a tree, said apparatus comprising a supply system for supplying particulate material; wherein the supply system comprises:
i) a buffer, and ii) at least one chute, wherein the at least one chute
　is a gravity-fed chute, and
　the at least one chute having a distal end section comprising a distal chute opening and a lower edge.

Such an apparatus is useful in the method according to the disclosure. The application also relates to any embodiment of the apparatus as disclosed in the dependent claims, discussion thereof and in the application as a whole, in any combination, with repetition being abstained from for the sake of brevity only.

According to one embodiment, the distal end section of the chute is provided with a stop for the container, and the container is moved to towards the stop and stopped by the stop.

According to one embodiment, the distal end section of the chute of the at least one chute comprises a shell half comprising a concave side designed to center the container between distal openings of chutes.

According to one embodiment, the distal end section of a chute of the at least one chute comprises a press plate configured to compress particulate material that has been supplied to the container. More specifically, the press plate has a side having an arcuate form facing a stem of a tree when compressing particulate material that has been supplied to the container.

BRIEF DESCRIPTION OF THE DRAWINGS

The present invention will now be illustrated with reference to the drawings where.

DESCRIPTION OF EMBODIMENTS

Figure 1A:
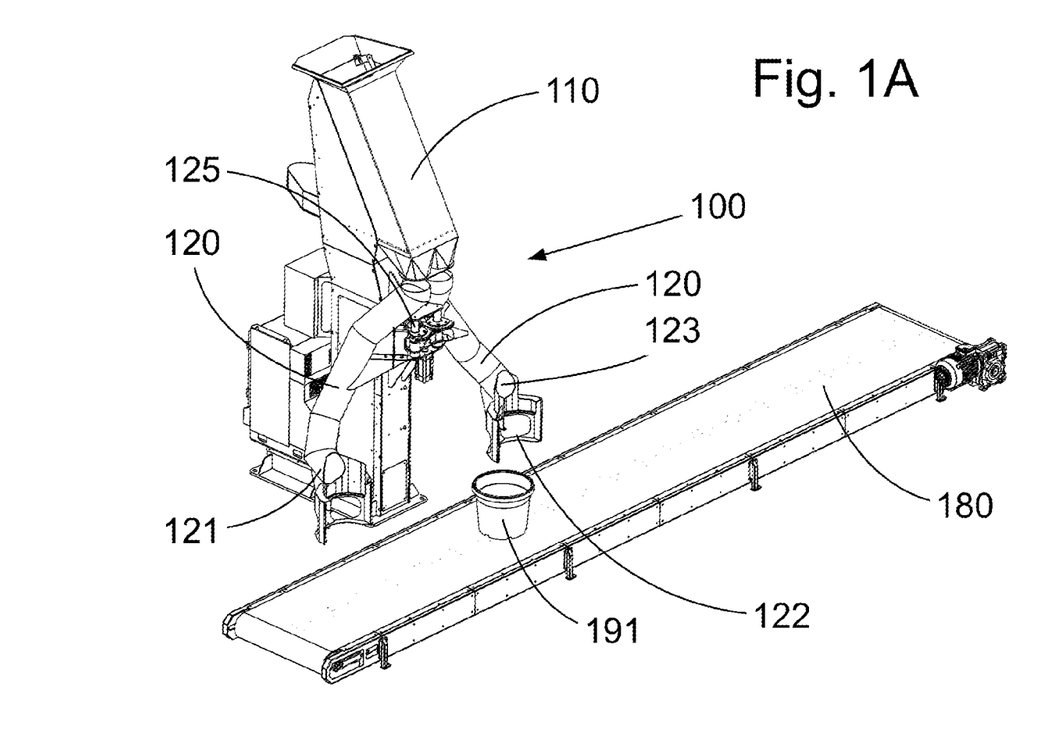
FIG. 1A to FIG. 1D illustrate a method for potting a tree.
Figure 1B:
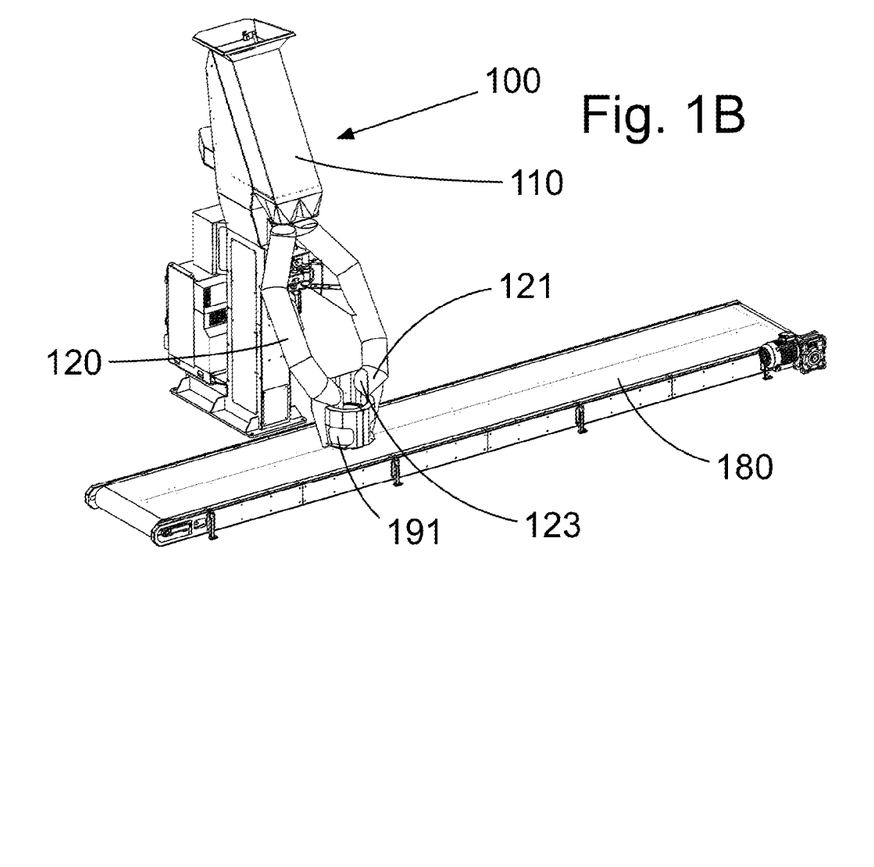
Figure 1C:
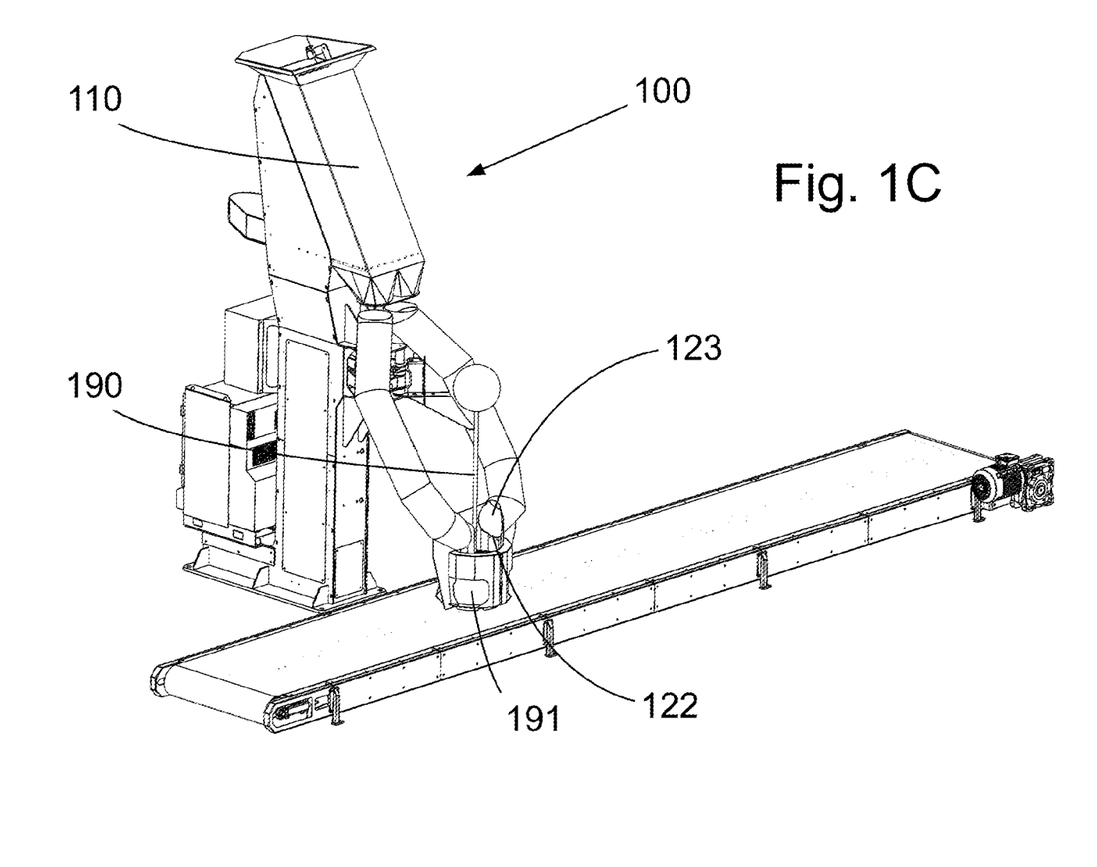

FIG. 1A to FIG. 1D illustrate a method for potting a tree 190. A pot 191 is supplied using a conveyor belt 180 to an apparatus 100 for potting the tree 190. The conveyor belt 180 is stopped when the pot 191 arrives in front of the apparatus 100 (FIG. 1A). This may be automated using a sensor, for example, an optical sensor such as a photocell.

In the embodiment discussed here the apparatus 100 for potting a tree comprises a buffer 110 for particulate material and two chutes 120. The two chutes 120 are rotatably mounted along vertical axes 125 allowing them to be in a first open position (FIG. 1A and FIG. 1D) wherein distal end sections 121 of the chutes are adjacent to the conveyor belt, and in a second closed position (FIG. 1B and FIG. 1C) wherein lower edges 122 of the chutes 120 are above the pot 191.

The buffer 110 is filled while the pot 191 is being transported to the apparatus 100. This saves time. Once the buffer 110 is filled with a predetermined amount of particulate material (e.g. potting soil), this amount is released from the buffer in a batch-wise manner and slides via the chutes 120 (in the second position) through distal openings 123 in the distal end sections 121 over the lower edges 122 into the pot 191.

Figure 1D:
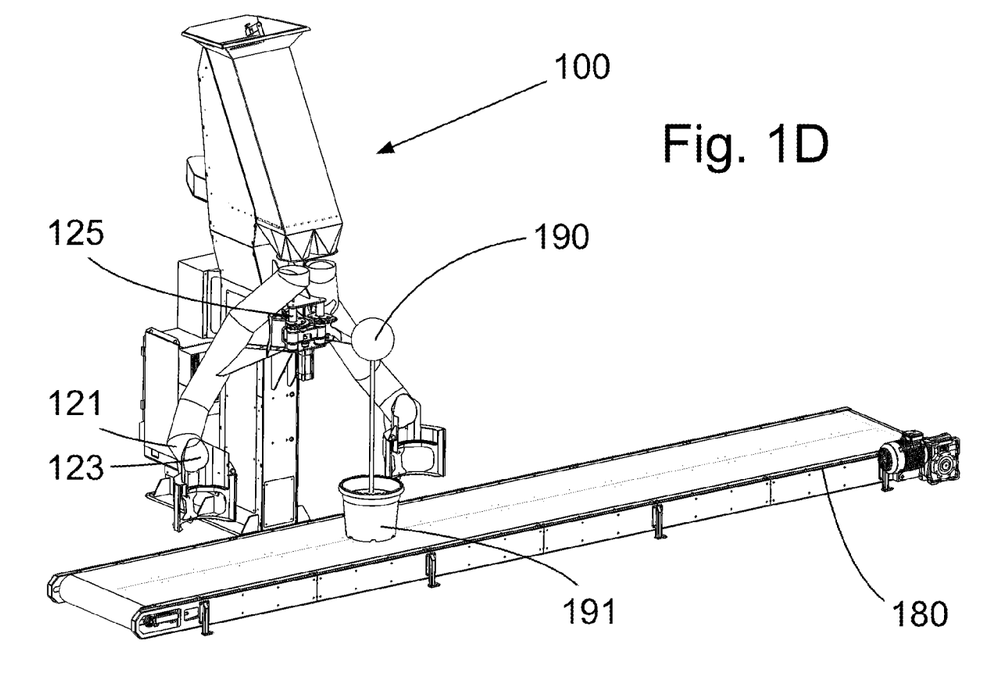

The chutes 120 are then rotated to the first position, allowing the conveyor belt 180 to remove the potted tree away and supply a new pot.

Figure 2:
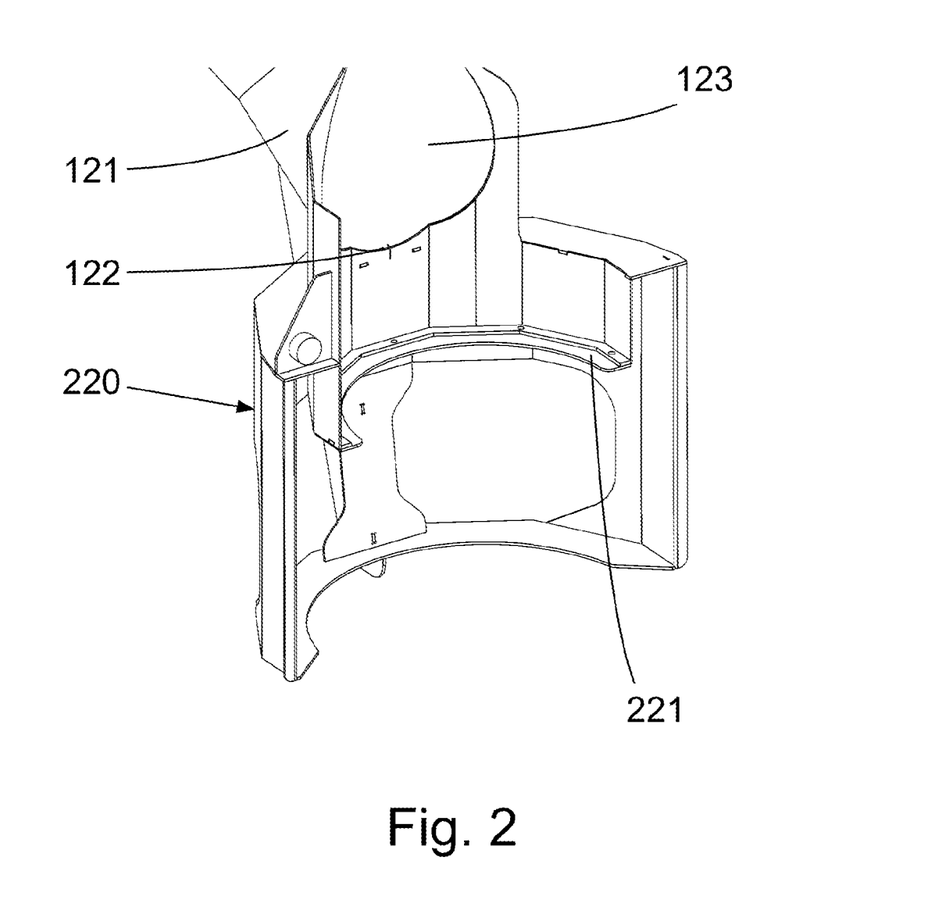
FIG. 2 shows a distal end section of a chute of an apparatus comprising a supply system.
Figure 3A:
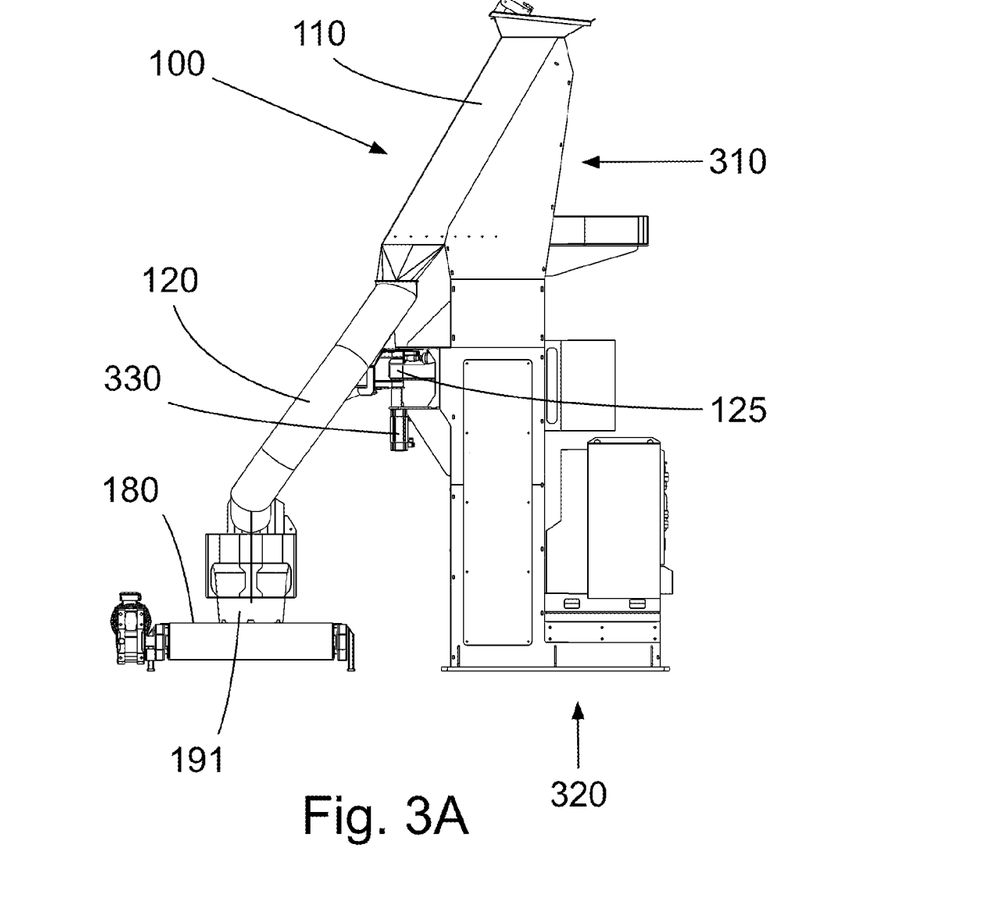
FIG. 3A to FIG. 3D show side views and front views in two height positions of chutes.
Figure 3B:
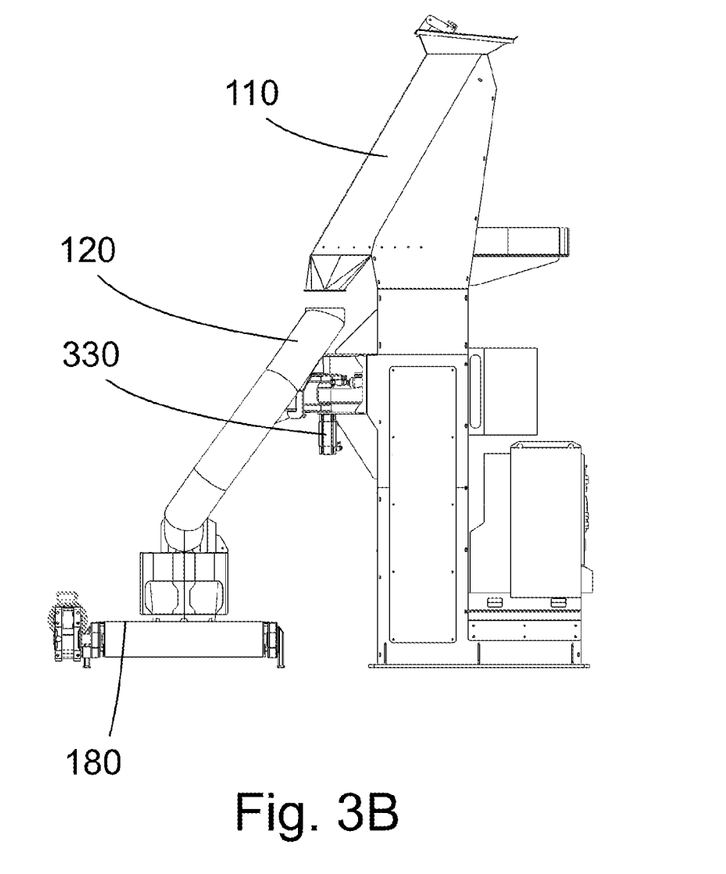
Figure 3C:
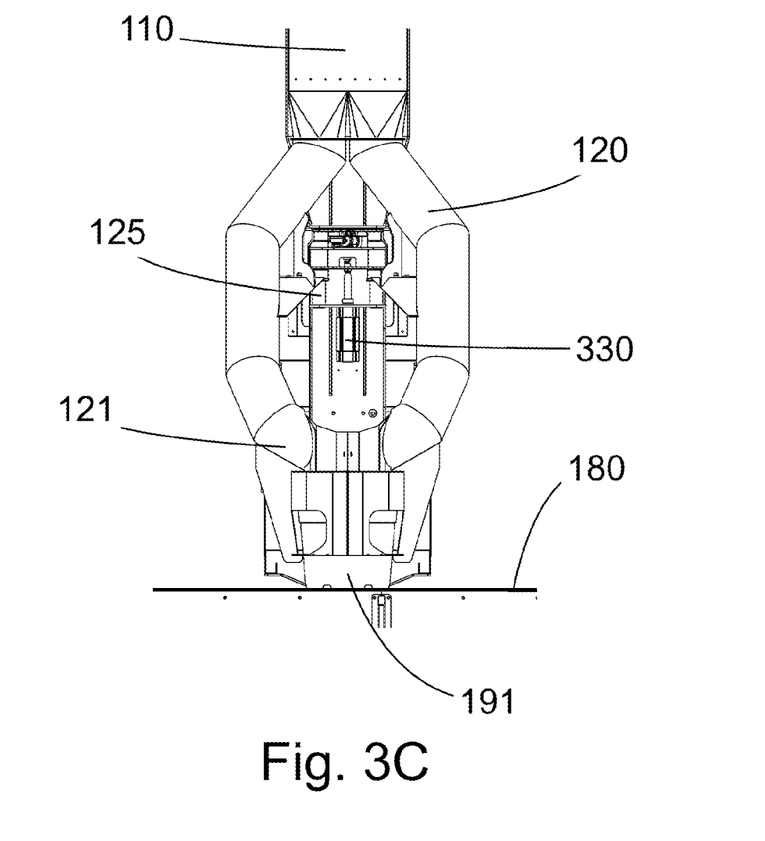
Figure 3D:
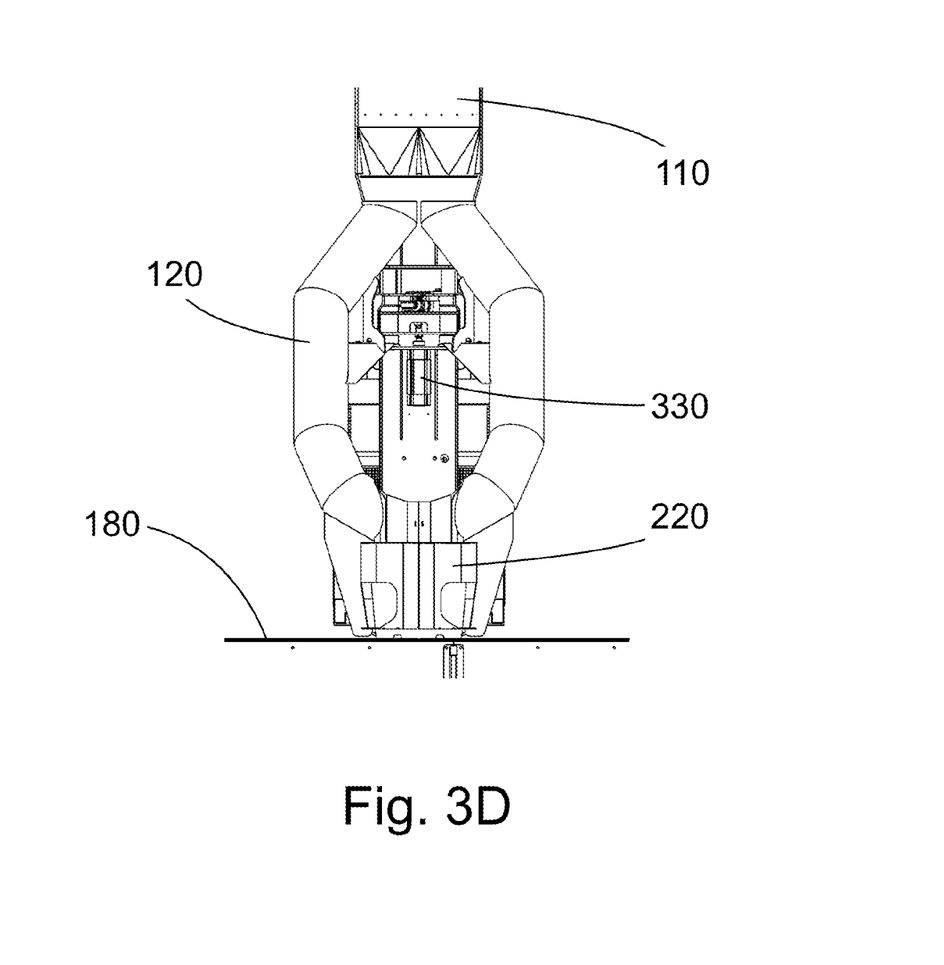

FIG. 2 shows a distal end section 121 of a chute 120 of the apparatus 100. Particulate material such as soil passes through the distal opening 123 over the lower edge 122 into the pot 191 (not shown).

In the embodiment discussed here, each distal end section 121 comprises a shell half 220. The shell half is arranged below the distal opening 123. Both shell halves 220 together are capable of surrounding the pot 191 to prevent it from falling over. In addition, when the two chutes 120 are moved from the first open position to the second closed position, the shell halves 220 come together and center the pot 191 between the distal openings 123 of two chutes 120. As a result, the soil is better distributed over the pot 191. Each shell halve 220 has a concave inner side facing the pot 191. When the chutes are in second position, the concave inner side of a shell halve 220 of one of the two chutes is facing in an upstream direction of conveyer belt 180 and the concave inner side of a shell halve of the other of the two chutes is facing in a downstream direction of the conveyer belt.

According to one embodiment, the distal end section 121 of a chute 120 comprises a press plate 221 and the particulate substrate is compressed by moving the distal end section 121 and hence the press plate 221 downward. Thus the root system becomes firmly embedded in the particulate material. The press plate has an arcuate form and has a concave side facing the stem of the plant to be potted. This allows for better compression of the particulate material in the pot and between roots of the root system of the plant, as a result of which the plant is more likely to remain its upright orientation in relation to the pot.

FIG. 3A to FIG. 3D show side views and front views in respectively a relatively high position of chutes 120 and a relatively low position, as used for compressing particulate material released in a pot.

The apparatus 100 comprises a base 320, a buffer section 310 comprising the buffer 110 and the chutes 120.

A pneumatic cylinder 330 is used to move the chutes 120 from a relatively high position (FIG. 3C; cylinder extended) to a relatively low position (FIG. 3D), and vice versa.

Figure 4A:
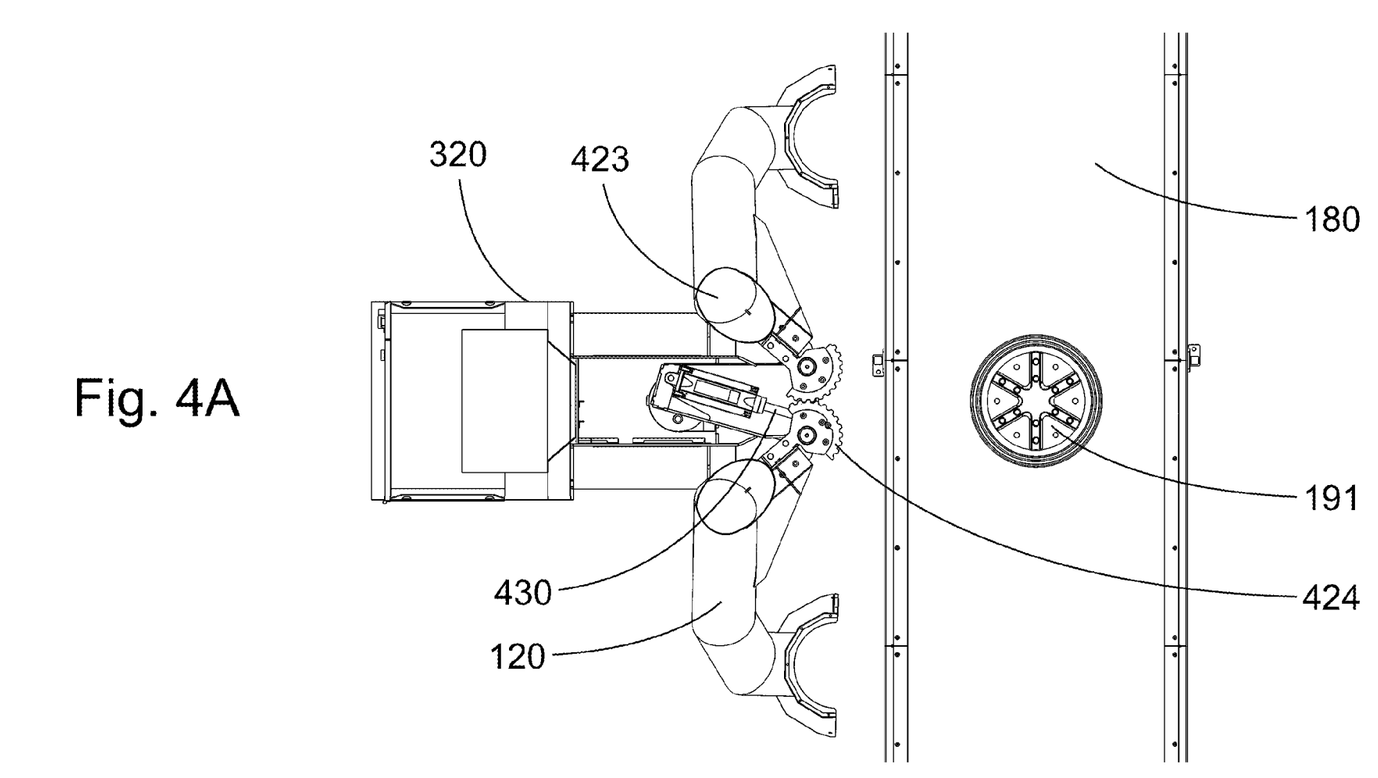
FIG. 4A and FIG. 4B show cutaway top views of the apparatus in two positions.
Figure 4B:
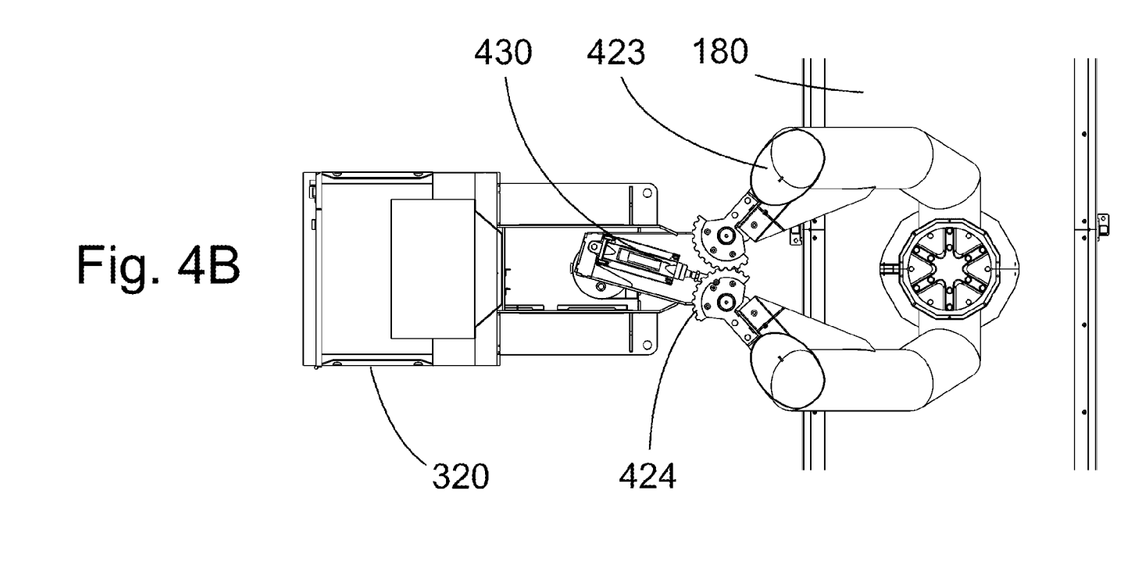

FIG. 4A and FIG. 4B show cutaway top views of the apparatus 100 in two positions of the chutes 120. The two chutes 120 are rotatably mounted along vertical axes 125 allowing them to be in a first open position (FIG. 4A) wherein distal end sections 121 of the chutes are adjacent to the conveyor belt 180, and in a second closed position (FIG. 4B) wherein lower edges 122 of the chutes 120 are above the pot.

The chutes 120 are rotatable about axes 125 and are connected via toothed wheels 424, one of which is driven off-center by a pneumatic piston 430.

The ingress openings 423 of the chutes 120 are visible as well.

Figure 5A:
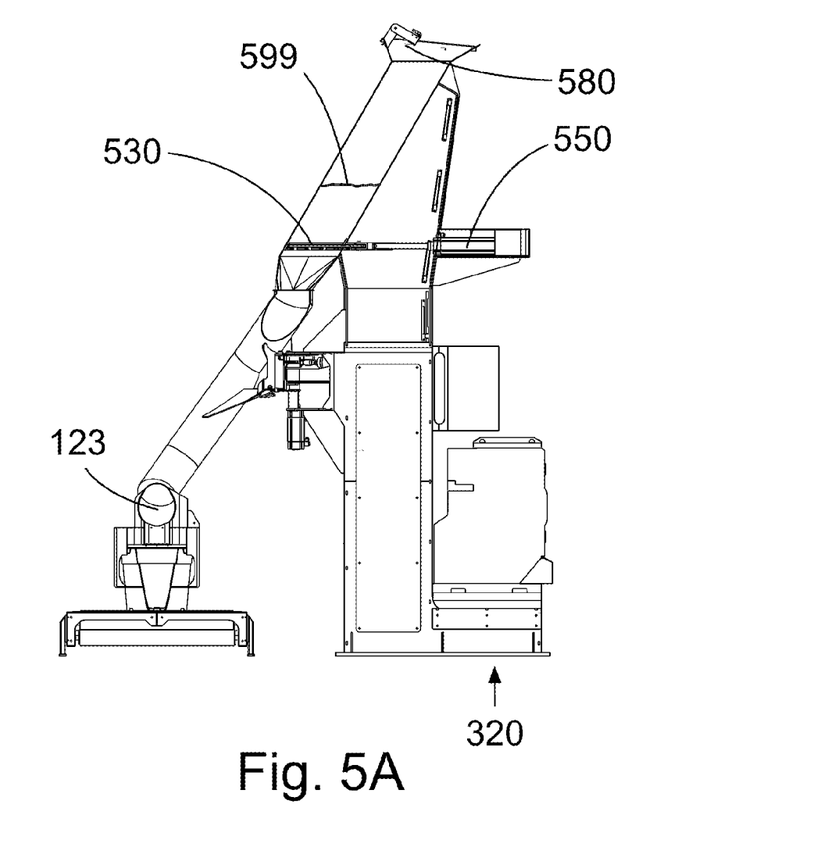
FIG. 5A and FIG. 5B show cutaway side and perspective views respectively of the apparatus for potting trees.
Figure 5B:
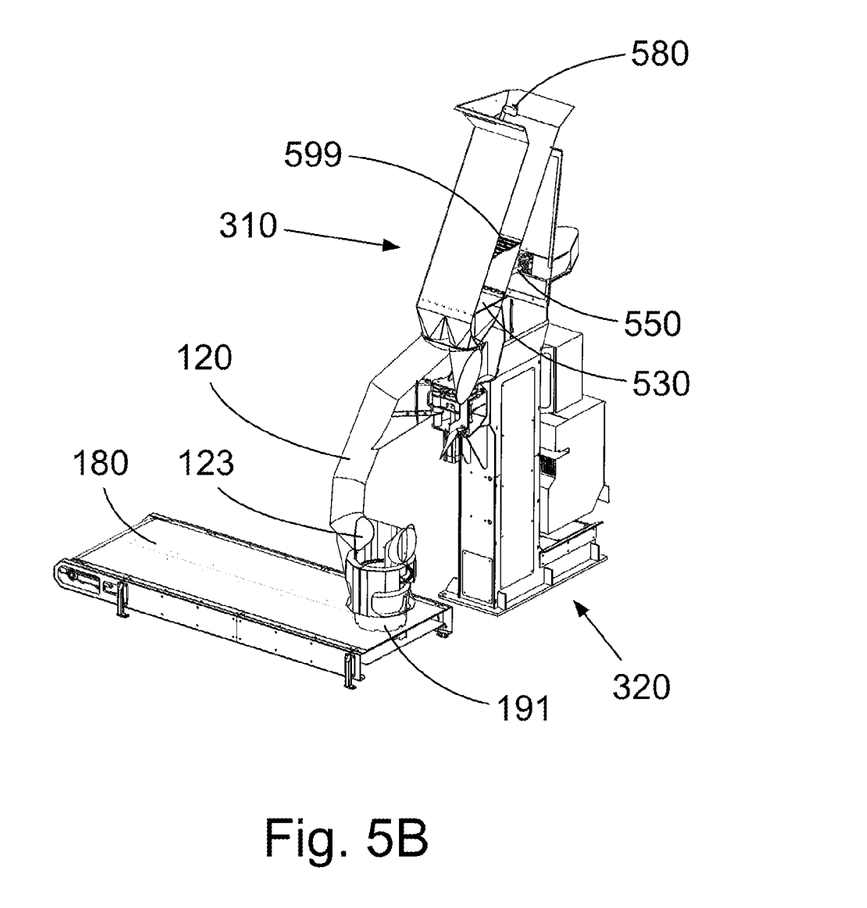

FIG. 5A and FIG. 5B show cutaway side and perspective views respectively of the apparatus for potting trees. The buffer section 310 comprises a valve 530 actuated by a pneumatic cylinder 550 for batch-wise release of particulate material 599.

The apparatus 100 also comprises a level sensor 580 (e.g., a laser distance meter) for determining whether the buffer 110 has been supplied with a desired amount of particulate material 599 for the task at hand, which typically depends on the size of the pot. The buffer 110 can be fed using any method in the art known, such as a transport screw, which will be under control of a control unit (not shown) making use of the level sensor 580 for input.

Figure 6A:
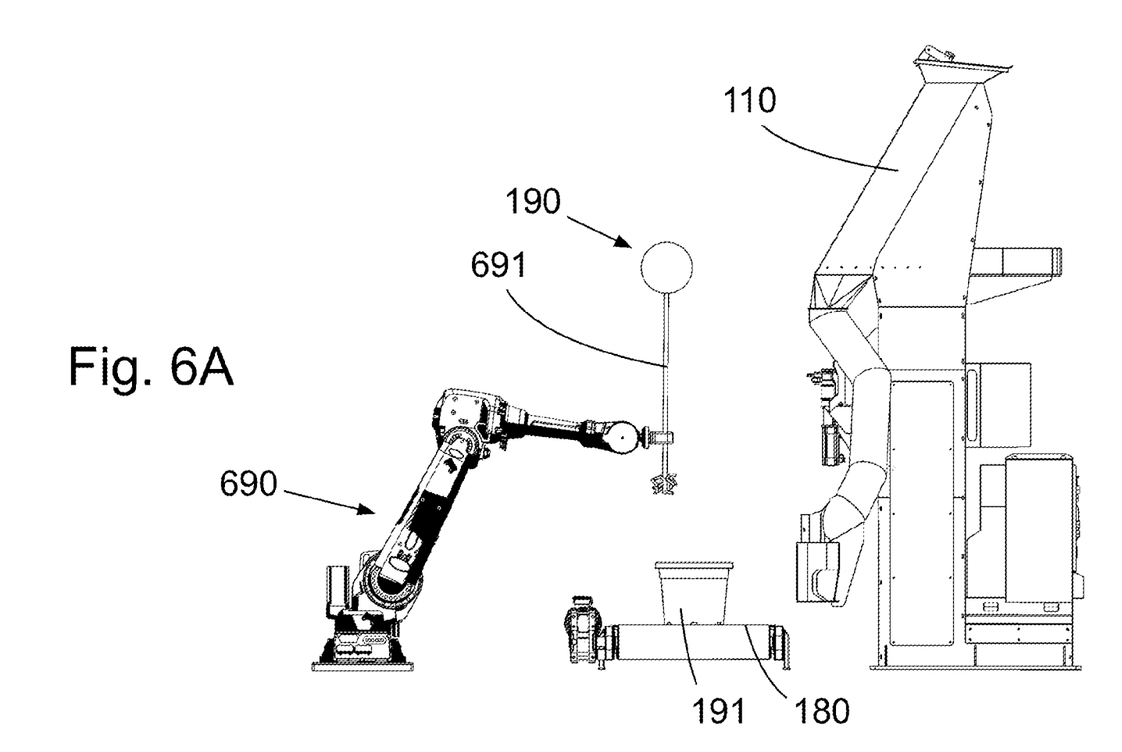
FIG. 6A and FIG. 6B show side views corresponding to FIG. 1B and FIG. 1C.
Figure 6B:
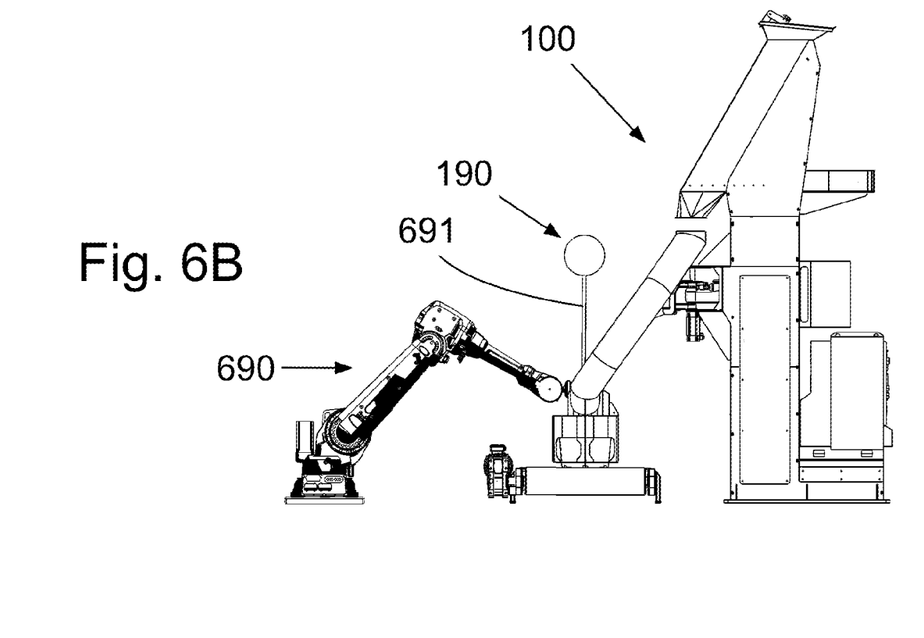

The present method and apparatus lend themselves to further automation very well. FIG. 6A and FIG. 6B show side views corresponding to FIG. 1B and FIG. 1C, and show a robot 690 supplying a tree 190 to be potted (FIG. 6A) and holding it by its stem 691 during potting (FIG. 6B).

The invention claimed is:

1. A method of planting a tree in a container, wherein said tree comprising a root system and a stem, and
a container for potting the plant is used, said container comprising a bottom wall, a sidewall extending from the bottom wall and an opening defined by the distal end of the sidewall, wherein the bottom wall and the sidewall define a lumen;
wherein the method comprises the steps of:
inserting the root system of the tree into the lumen of the container, and
supplying a particulate substrate to the container via the opening to cover the root system, the particulate substrate being supplied using an apparatus comprising a supply system;
characterized in that the supply system comprises i) a buffer, and ii) at least one chute, wherein the method comprises:
providing the buffer with a predetermined amount of particulate substrate, and
batch-wise release of the particulate material in the buffer to provide the container with the particulate material from the buffer via the at least one chute by gravity, the at least one chute having a distal end section comprising a distal chute opening and a lower edge, said lower edge being provided above the bottom of the container,
wherein the distal end section of a chute of the at least one chute comprises press plate and the particulate substrate is compressed by relatively moving the bottom of the container and the distal end section moved closer to each other.

2. The method according to claim 1, wherein the apparatus comprises a valve between the buffer and the at least one chute, and the method comprises:
in a state where the valve is closed, providing the buffer with a predetermined amount of particulate substrate, and
for the step of batch-wise release of the particular material opening the valve.

3. The method according to claim 1, wherein at least the distal end section of the chute is inclined with respect to the bottom of the container.

4. The method according to claim 1, wherein the ratio of i) the smallest cross-sectional area of the buffer transverse to the centerline of the buffer, and ii) the sum of the smallest cross-sectional areas transverse to the centerline of the chutes is at most 2, preferably less than 1.4 and most preferably 1 or less.

5. The method according to claim 1, wherein the buffer is a slanted buffer.

6. The method according to claim 1, wherein while the buffer is provided with the particulate substrate, a height of the particulate substrate in the buffer is monitored and providing the particulate substrate to the buffer is stopped when a predetermined height is achieved.

7. A method of planting a tree in a container, wherein said tree comprising a root system and a stem, and
a container for potting the plant is used, said container comprising a bottom wall, a sidewall extending from the bottom wall and an opening defined by the distal end of the sidewall, wherein the bottom wall and the sidewall define a lumen;
wherein the method comprises the steps of:
inserting the root system of the tree into the lumen of the container, and supplying a particulate substrate to the container via the opening to cover the root system, the particulate substrate being supplied using an apparatus comprising a supply system;

characterized in that the supply system comprises i) a buffer, and ii) at least one chute, wherein the method comprises:

providing the buffer with a predetermined amount of particulate substrate, and batch-wise release of the particulate material in the buffer to provide the container with the particulate material from the buffer via the at least one chute by gravity, the at least one chute having a distal end section comprising a distal chute opening and a lower edge, said lower edge being provided above the bottom of the container, wherein the at least one chute is rotatably mounted with a proximal end section of the at least one chute being closer to the axis of rotation than the distal end section thereof.

8. A method of planting a tree in a container, wherein said tree comprising a root system and a stem, and a container for potting the plant is used, said container comprising a bottom wall, a sidewall extending from the bottom wall and an opening defined by the distal end of the sidewall, wherein the bottom wall and the sidewall define a lumen;

wherein the method comprises the steps of:

inserting the root system of the tree into the lumen of the container, and supplying a particulate substrate to the container via the opening to cover the root system, the particulate substrate being supplied using an apparatus comprising a supply system;

characterized in that the supply system comprises i) a buffer, and ii) at least one chute, wherein the method comprises:

providing the buffer with a predetermined amount of particulate substrate, and batch-wise release of the particulate material in the buffer to provide the container with the particulate material from the buffer via the at least one chute by gravity, the at least one chute having a distal end section comprising a distal chute opening and a lower edge, said lower edge being provided above the bottom of the container, wherein the distal end section of the chute comprises a shell half comprising a concave side designed to center the container between distal openings of chutes.

9. An apparatus for potting a tree in a container, said apparatus comprising a supply system for supplying particulate material;

characterized in that the supply system comprises i) a buffer, and ii) at least one chute, wherein the at least one chute:

is a gravity-fed chute, and the at least one chute having a distal end section comprising a distal chute opening and a lower edge, wherein the distal end section of a chute of the at least one chute comprises a press plate configured to compress particulate material that has been supplied to the container.

10. The apparatus according to claim 9, wherein the press plate has a side having an arcuate form facing a stem of a tree when compressing particulate material that has been supplied to the container.

11. An apparatus for potting a tree in a container, said apparatus comprising a supply system for supplying particulate material;

characterized in that the supply system comprises i) a buffer, and ii) at least one chute, wherein the at least one chute:

is a gravity-fed chute, and the at least one chute having a distal end section comprising a distal chute opening and a lower edge, wherein the distal end section of the chute of the at least one chute comprises a shell half comprising a concave side designed to center the container between distal openings of chutes.

\* \* \* \* \*